(12) United States Patent
Fraser et al.

(10) Patent No.: US 10,502,222 B2
(45) Date of Patent: Dec. 10, 2019

(54) RETENTION COMPONENT FOR TURBOMACHINERY DEVICE

(71) Applicant: BorgWarner Inc., Auburn Hills, MI (US)

(72) Inventors: Brock S. Fraser, Asheville, NC (US); Allen D. Stoner, II, Fletcher, NC (US)

( * ) Notice: Subject to any disclaimer, the term of this patent is extended or adjusted under 35 U.S.C. 154(b) by 0 days.

(21) Appl. No.: 16/099,348

(22) PCT Filed: May 6, 2016

(86) PCT No.: PCT/US2016/031251
§ 371 (c)(1),
(2) Date: Nov. 6, 2018

(87) PCT Pub. No.: WO2017/192149
PCT Pub. Date: Nov. 9, 2017

(65) Prior Publication Data
US 2019/0154049 A1    May 23, 2019

(51) Int. Cl.
*H02K 1/06*    (2006.01)
*F04D 29/056*    (2006.01)
(Continued)

(52) U.S. Cl.
CPC ............ *F04D 29/056* (2013.01); *F02B 33/40* (2013.01); *F02B 39/10* (2013.01); *F02B 39/14* (2013.01);
(Continued)

(58) Field of Classification Search
CPC ........ H02K 5/16; H02K 5/1732; H02K 7/083; H02K 9/19; H02K 5/1675; H02K 7/086
(Continued)

(56) References Cited

U.S. PATENT DOCUMENTS 2,381,122 A   *   8/1945   Fechheimer ........... H02K 9/197
                                                                           310/61
3,735,174 A   *   5/1973   Bosch ...................... H02K 3/00
                                                                          310/266

(Continued)

FOREIGN PATENT DOCUMENTS

JP        2006090274 A      4/2006

OTHER PUBLICATIONS

International Search Report for PCT/US2016/031251 dated Jan. 6, 2017.

*Primary Examiner* — Thanh Lam
(74) *Attorney, Agent, or Firm* — BrooksGroup

(57) ABSTRACT

A number of variations may include a product comprising: a turbomachinery device comprising: an electric motor surrounding a portion of a shaft constructed and arranged to selectively drive the shaft in rotation about a rotational axis, wherein the electric motor further comprises a stator comprising a lamination stack; a housing surrounding the electric motor, wherein the housing includes a plurality of channels constructed and arranged to lubricate a first bearing; and wherein the lamination stack includes at least one retention component wherein the retention component is constructed and arranged to locking the stator in an axial direction while locking rotation of the stator about the rotational axis and wherein the retention component further comprises at least one conduit constructed and arranged to pass fluid through the electric motor to a second bearing.

20 Claims, 3 Drawing Sheets

(51) Int. Cl.
*F02B 39/10* (2006.01)
*F04D 25/06* (2006.01)
*F04D 29/063* (2006.01)
*H02K 5/16* (2006.01)
*H02K 9/19* (2006.01)
*F02B 33/40* (2006.01)
*F02B 39/14* (2006.01)
*F04D 29/10* (2006.01)
*H02K 5/173* (2006.01)
*H02K 7/08* (2006.01)

(52) U.S. Cl.
CPC ......... *F04D 25/06* (2013.01); *F04D 25/0606* (2013.01); *F04D 29/063* (2013.01); *F04D 29/102* (2013.01); *H02K 5/16* (2013.01); *H02K 5/1732* (2013.01); *H02K 7/083* (2013.01); *H02K 9/19* (2013.01); *F05D 2220/40* (2013.01)

(58) Field of Classification Search
USPC .............................................. 310/52–59, 90
See application file for complete search history.

(56) References Cited

U.S. PATENT DOCUMENTS

| 4,577,128 | A | | 3/1986 | Gould et al. | |
|---|---|---|---|---|---|
| 5,034,638 | A | * | 7/1991 | McCabria | F16N 39/02 310/52 |
| 7,071,585 | B2 | * | 7/2006 | Iida | H02K 1/28 310/261.1 |
| 8,344,576 | B2 | | 1/2013 | Hippen et al. | |
| 8,916,997 | B2 | * | 12/2014 | Kirkley, Jr. | H02K 1/32 310/54 |
| 9,970,450 | B1 | * | 5/2018 | Kelly | F04D 29/059 |
| 2007/0227470 | A1 | | 10/2007 | Cole et al. | |
| 2015/0226323 | A1 | | 8/2015 | Pohl et al. | |
| 2017/0107897 | A1 | * | 4/2017 | Fraser | F01D 5/02 |

* cited by examiner

RETENTION COMPONENT FOR TURBOMACHINERY DEVICE

TECHNICAL FIELD

The field to which the disclosure generally relates to includes turbomachinery.

BACKGROUND

In a number of variations, a turbocharger may include an electric motor.

SUMMARY OF ILLUSTRATIVE VARIATIONS

A number of variations may include a product comprising: a turbomachinery device comprising: an electric motor surrounding a portion of a shaft constructed and arranged to selectively drive the shaft in rotation about a rotational axis, wherein the electric motor further comprises a stator comprising a lamination stack; a housing surrounding the electric motor, wherein the housing includes a plurality of channels constructed and arranged to lubricate a first bearing; and wherein the lamination stack includes at least one retention component wherein the retention component is constructed and arranged to lock the stator in an axial direction while locking rotation of the stator about the rotational axis, and wherein the retention component further comprises at least one conduit constructed and arranged to pass fluid through the electric motor to a second bearing.

A number of variations may include a method comprising: providing a turbomachinery device comprising a rotational shaft, a first bearing, a second bearing and an electric motor comprising a stator comprising a at least one retention component wherein the retention component is constructed and arranged to lock the stator in an axial direction while locking rotation of the stator about a rotational axis, and wherein the retention component further comprises at least one conduit constructed and arranged to pass fluid through the electric motor to a second bearing; and feeding fluid to one end of a turbocharger housing so that fluid is supplied to a first bearing and through the at least one conduit so that fluid is supplied to a second bearing.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
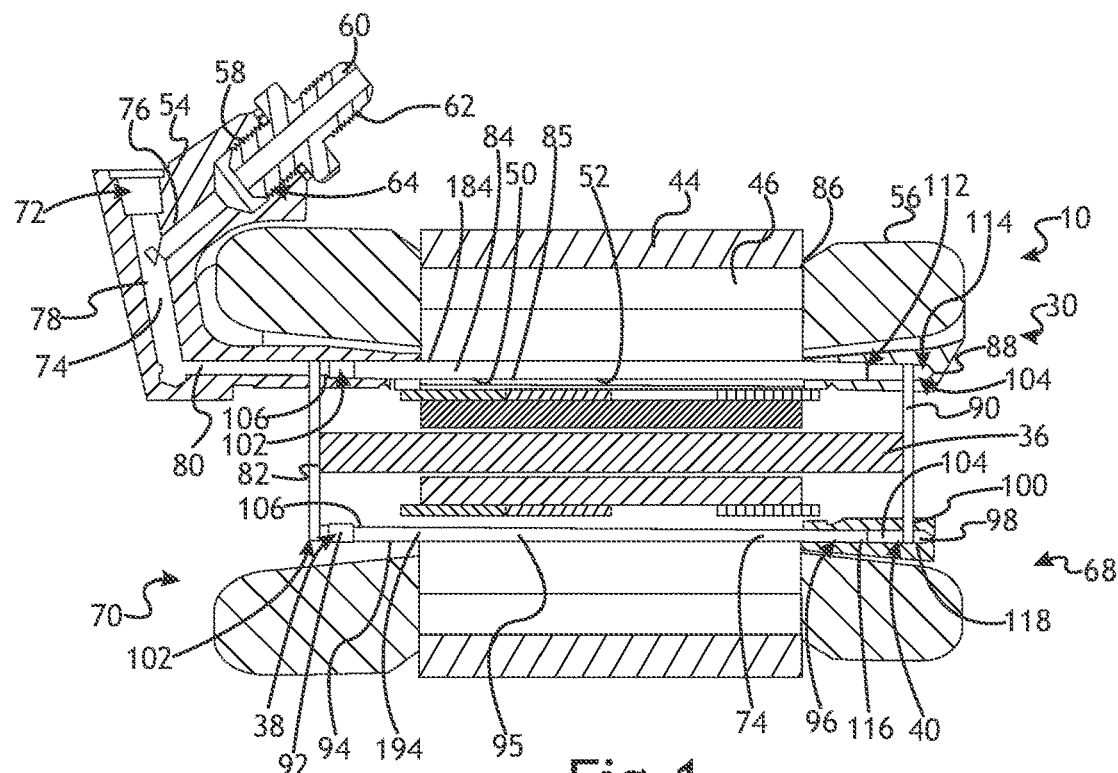
FIG. 1 illustrates a section view of a bearing lubrication system in an electric turbocharger according to a number of variations.
Figure 2:
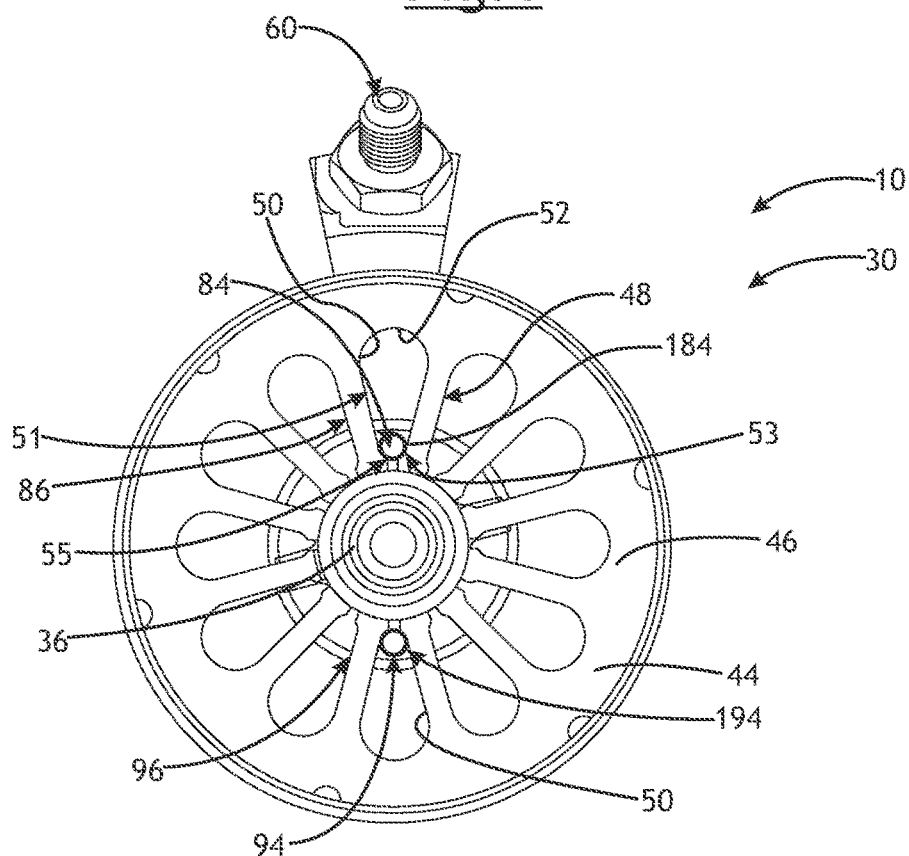
FIG. 2 illustrates an end view of a bearing lubrication system in an electric turbocharger according to a number of variations.

Referring to FIG. 1, in a number of variations, a product 10 is shown. In a number of variations, the product 10 may include a turbomachinery device 10. In a number of variations, the turbomachinery device may be a device that includes a high speed machine that includes a rotor and a fluid and transfers energy from a fluid to a rotor or vice versa. In a number of variations, the turbomachinery device 10 may include at least one of a turbocharger, an electrified turbocharger, a compressor, a turbine, an expansion device, an organic rankine cycle (ORC) device, a motor used in turbomachinery, a booster, an electrified booster, an electrified turbo compound component, or may be another device. In a number of non-limiting variations, as shown in FIG. 1, the product 10 may include an electrified turbocharger 30. In a number of variations, the product 10 may include at least one of a turbine end 68 or a compressor end 70, a variation of which is illustrated in FIG. 1. In a number of variations, electrified turbocharger 30 may comprise a turbine wheel which may be operatively connected to a compressor wheel through a shaft 36. In a number of variations, the turbine wheel may receive thermodynamic power from exhaust gas from the system and may drive the shaft 36 which may then drive the compressor wheel. In a number of variations, the shaft 36 may be supported for rotation by at least one bearing 38, 40. In a number of variations, the product 10 may include a first bearing 38 and a second bearing 40. In a number of variations, the product 10 may include an electric motor. In a number of variations, the electric motor may surround a portion of the shaft 36 and may be used to selectively drive the shaft 36 through the use of an electronic control unit (ECU)(not shown) based on the conditions and/or application of the product 10. In a number of variations, the electric motor 42 may comprise a stator 44 which may comprise a lamination stack 46. The lamination stack 46 may comprise a plurality of teeth 48 surrounding an inner perimeter 52 of the lamination stack 46, a non-limiting variation of which is illustrated in FIG. 2. In a number of variations, the product 10 may include at least one housing 54, 56. In a number of variations, the product 10 may include a first housing 54 and a second housing 56. In a number of variations, the at least one housing 54, 56 may surround the electric motor 42 and the at least one bearing 38, 40. In a number of variations, the product 10 may include a bearing lubrication system 72. In a number of variations, a fluid 74 may be provided to the first and second bearings 38, 40 through the bearing lubrication system 72 in order to ensure proper rotation of the shaft 36. In a number of variations, the fluid 74 may include oil, coolant, or may be another type.

Referring again to FIG. 1, in a number of variations, a product 10 including a bearing lubrication system 72 may utilize a lamination stack 46 of a stator 44, which may be constructed and arranged to include one or more retention components 184, 194. In a number of variations, the one or more retention components 184, 194 may include one or more conduits 84, 94 which may be used to pass fluid through the electric motor 42 to the first and the second bearings 38, 40. In a number of variations, this may allow fluid 74 to be supplied through one end of the turbocharger 30 and fed to the first bearing 38 and the second bearing 40 without having a complex circuit of drilled fluid channels in order to wrap around the outside of the stator 44. In a number of variations, feeding fluid 74 through the electric motor 42 may also allow for reduced packing space as the complex drilled fluid channels are no longer required on one end of the turbocharger 30 which may allow for simplified machining on one end of the housing 54, 56.

In a number of variations, the bearing lubrication system 72 may also utilize a housing 54, 56 which may comprise a first housing portion 54 and a second housing portion 56, a variation of which is illustrated in FIG. 1. In a number of variations, the first housing portion 54 may include a threaded bore 58 defined by an inner threaded surface which may be constructed and arranged to accommodate a fluid feed tube 60. In a number of variations, the threaded bore 58 may be positioned at an angle in the first housing portion 54. In a number of variations, the fluid feed tube 60 may be partially threaded 62 at the ends 64 of the fluid feed tube 60 and may include a pilot feature (not shown) which may ensure that the threads 62 are true before threading begins in manufacture of the product 10, which may protect the threads 58, 62 from cross threading. In a number of variations, the first housing portion 54 may be adjacent the turbine end 68 or the compressor end 70, a variation of which is illustrated in FIG. 1.

In a number of variations, a first fluid channel 76 may extend from the threaded bore 58 in the first housing portion 54. In one variation, the first fluid channel 76 may extend at the same angle as the threaded bore. The first fluid channel 76 may be connected to a second fluid channel 78 which may extend downward within the first housing portion 54. In one variation, the second fluid channel 78 may extend at an angle inward toward the first bearing 38 and may be connected to a third fluid channel 80. In a number of variations, the third fluid channel 80 may extend horizontally from the second fluid channel 78 toward the inner perimeter 52 of the stator 44. The third fluid channel 80 may be connected to a fourth fluid channel 82 as well as a first fluid conduit 84 which may extend through an opening 50 between the teeth 48 on a first end 86 of the stator 44, a variation of which is illustrated in FIG. 2. In a number of variations, the opening 50 may have at least one sidewall 51. In a number of variations, the opening 50 may have a basewall 53 which may include a slot 55 formed from the intersection of the sidewalls 51. In a number of variations, the first fluid conduit 84 may be constructed and arranged to fit within the stator teeth opening 50 to ensure that the stator 44 is locked from rotation, a variation of which is also illustrated in FIG. 2. As used herein, the term "lock" is defined as preventing movement in at least one of the axial direction in relation to a cross section of the shaft 36, the radial direction in relation to a cross section of the shaft 36, or a rotational direction about the shaft 36. In a number of variations, the first fluid conduit 84 may be in contact with at least one sidewall 51 of the stator teeth opening 50. In a number of variations, the first fluid conduit 84 may be in contact with the basewall 53 of the stator teeth opening 50. In a number of variations, the first fluid conduit 84 may be in contact with a plurality of sidewalls 51 as well as the basewall 53 formed from the slot 55. The fourth fluid channel 82 may extend downward approximately perpendicular to the first bearing 38 and may provide fluid 74 to the first bearing 38. The first fluid conduit 84 may extend through the stator 44 into a fifth fluid channel 88 aligned with the first fluid conduit 84 in the second housing portion 56. The fifth fluid channel 88 may include a first diameter 112 which may be greater than the diameter of the first fluid conduit 84 and a second diameter 114 which may be less than that of the first fluid conduit 84 so that the first fluid conduit 84 may bottom out when it extends a distance into the fifth fluid channel 88. The fifth fluid channel 88 may also include a vertical channel 90 which may extend downward to the second bearing 40 to feed fluid 74 to the second bearing 40, a variation of which is illustrated in FIG. 1. The fourth fluid channel 82 may also be connected to a sixth fluid channel 92 which may be aligned with a second fluid conduit 94. The second fluid conduit 94 may extend through an opening 50 between the teeth 48 on a second end 96 of the stator 44, a variation of which is illustrated in FIG. 2. In a number of variations, the second fluid conduit 94 may be constructed and arranged to fit within the stator teeth 48 opening 50 to ensure that the stator 44 is locked from rotation, a variation of which is also illustrated in FIG. 2. In a number of variations, the second fluid conduit 94 may be in contact with at least one sidewall 51 of the stator teeth opening 50. In a number of variations, the second fluid conduit 94 may be in contact with the basewall 53 of the stator teeth opening 50. In a number of variations, the second fluid conduit 94 may be in contact with a plurality of sidewalls 51 as well as the basewall 53 formed from the slot 55. The second fluid conduit 94 may extend through the stator 44 to a seventh fluid channel 98 aligned with the second fluid conduit 94 in the second housing portion 56, a variation of which is illustrated in FIG. 1. The seventh fluid channel 98 may include a first diameter 116 which may be greater than the diameter of the second fluid conduit 94 and a second diameter 118 which may be less than the diameter of the second fluid conduit 94 so that the second fluid conduit 94 may bottom out when it extends a distance into the seventh fluid channel 98, a variation of which is illustrated in FIG. 1. The seventh fluid channel 98 may also include a vertical channel 100 which may extend upward to the second bearing 40 to feed fluid 74 to the second bearing 40 from the second fluid conduit 94.

Figure 3:
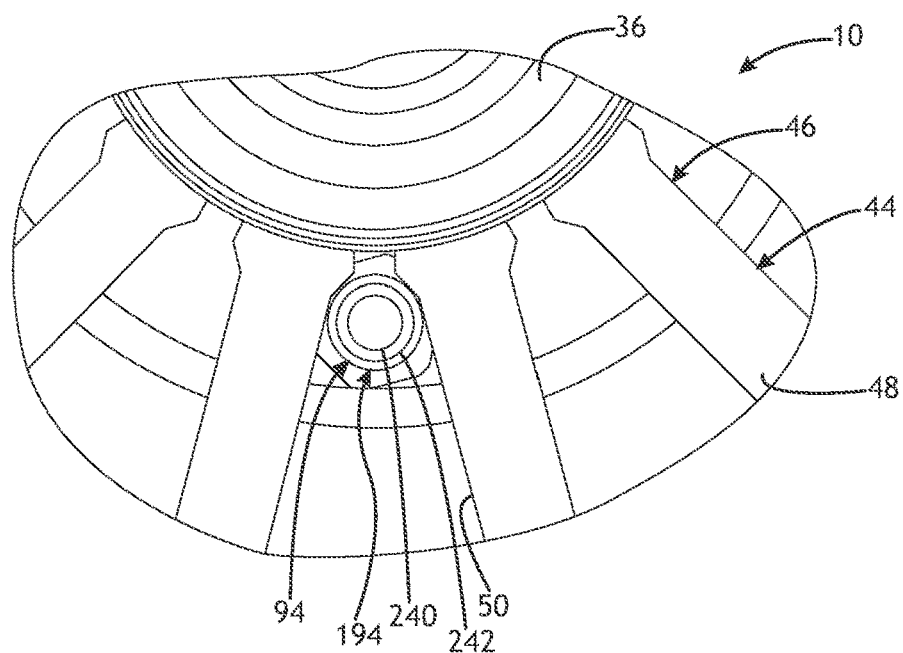
FIG. 3 illustrates a close-up end view of an oil tube according to a number of variations.

In a number of variations, at least one of the first retention component 184, the second retention component 194, the first fluid conduit 84 or the second fluid conduit 94 may be cylindrical, a variation of which is illustrated in FIG. 3. In a number of variations, at least one of the first retention component 184, the second retention component 194, the first fluid conduit 84 or the second fluid conduit 94 may be of a cross-sectional shape including, but not limited to, a circle, ellipse, polygonal, triangle, parallelogram, pentagon, hexagon, nonagon, decagon, n-gon, or may be another cross-sectional shape. In a number of variations, at least one of the first retention component 184, the second retention component 194, the first fluid conduit 84 or the second fluid conduit 94 may have a diameter that varies along its length. In a number of variations, the first retention component 184 or the second retention component 194 may be of a length longer than the stator 44 so that the second end 104 of the tubes 84, 94 may bottom out into the second housing portion 56, as discussed above, and so that the first ends 102 may accommodate at least one retention fastener 106, a variation of which is illustrated in FIG. 1. In a number of variations, the retention fastener 106 may be at least one of a nut, bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, tie, toggle bolt, zipper, wedge anchor, or may be another type. In a number of variations, the retention component 184, 194 may fix or lock or attach the retention component 184, 194 to the housing 54, 56. In a number of variations, the retention component 184, 194 may fix or lock or attach the stator 44 to the housing 54, 56. In a number of variations, the retention fastener 106 may provide a lock of the retention component 184, 194 in either the axial or rotational direction. In number of variations, the retention fastener 106 may provide a preload for clamping the stator 44 in its proper location. The first housing portion 54 may then be slid over the retention fastener 106 which may form a seal for the bearing lubrication system 72 which may reduce or prevent fluid from leaking from the first and second fluid conduits 84, 94.

Figure 4:
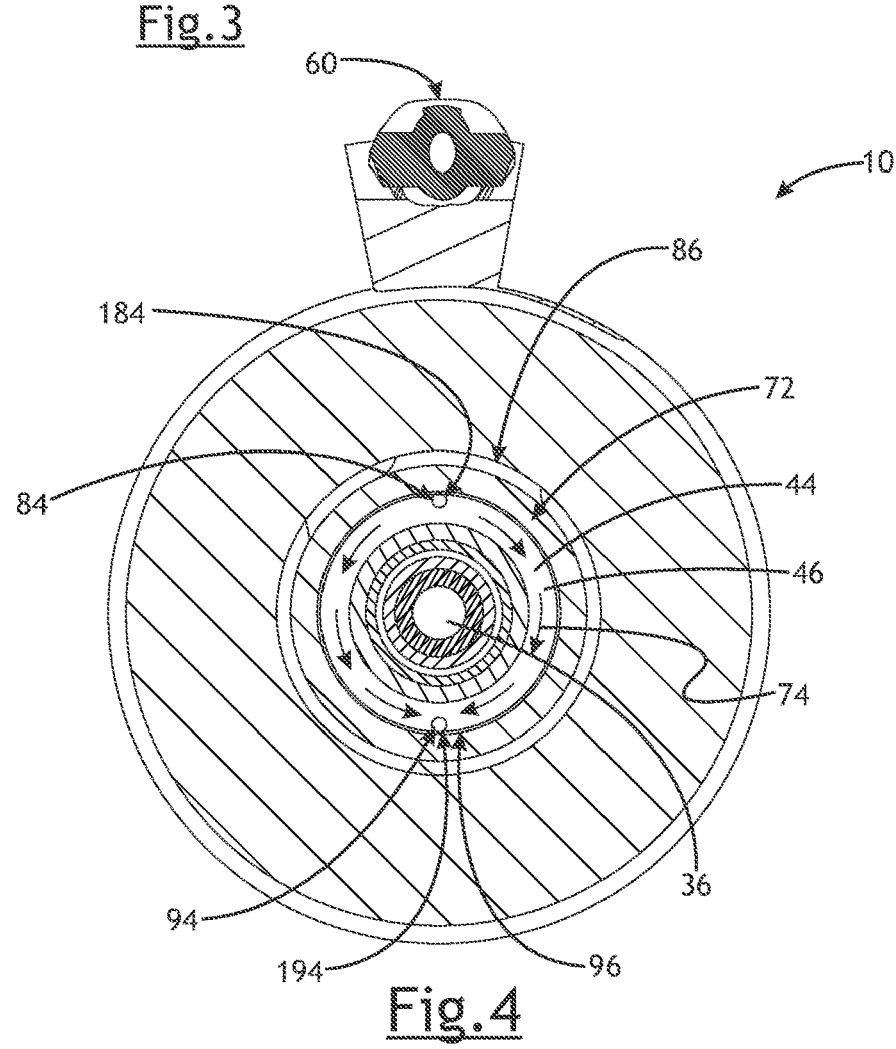
FIG. 4 illustrates a section end view of a bearing lubrication system in an electric turbocharger according to a number of variations.

In a number of variations, fluid 74 may be fed through the threaded fluid feed tube 60 into the fluid channels 76, 78, 80, 82, 92 in the first housing portion 54 so that fluid 74 may travel to the first bearing 38 while maintaining pressure through the bearing lubrication system 72. This may allow fluid 74 to also be fed through the first and second fluid conduits 84, 94 to the second bearing 40, variations of which are illustrated in FIGS. 1 and 4, and through the fluid channels 88, 98 in the second housing portion 56. In a number of variations, in FIG. 4, the first fluid conduit 84 may at least partially feed the second fluid conduit 94 while also lubricating the shaft 36 at at least one point along the length of the shaft 36, first fluid conduit 84, or second fluid conduit 94. In a number of variations, the retention component 184, 194 conduit 84, 94 may include a rod or tube. In a number of variations, the retention component 184, 194 conduit 84, 94 rod or tube may include an inner surface 240 and an outer surface 242 as illustrated in FIG. 4. In a number of variations, at least one of the first fluid conduit 84 or the second fluid conduit 94 may include at least one bore 85, 95 in a longitudinal side of the fluid conduit 84, 94, that may lubricate at least one point along the length of the shaft 36, first fluid conduit 84, or second fluid conduit 94. In a number of variations, the at least one bore 85, 95 may pierce at least a portion of the inner surface 240 and the outer surface 242 of the conduit 84, 94.

Figure 5:
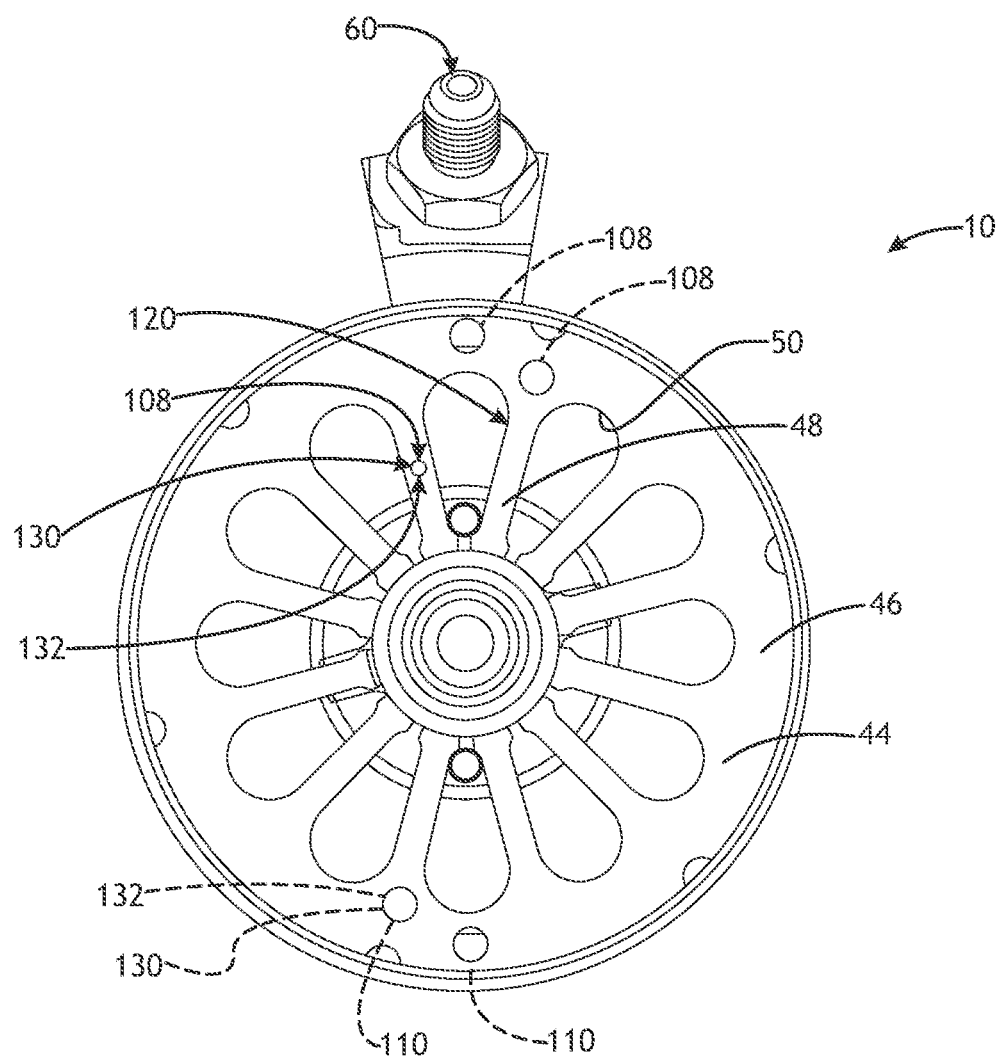
FIG. 5 illustrates an end view of a bearing lubrication system in an electric turbocharger according to a number of variations.

Referring to FIG. 5, in a number of variations, at least one conduit 108, 110 defined by an inner cylindrical surface may be formed through the stator 44 lamination stack 46 to feed fluid 74 to the second bearing 40 in the same manner as illustrated above. In a number of variations, a first conduit 108 may extend through a first tooth 48 of the lamination stack 46 and/or a second conduit 110 may extend through a second tooth 48 of the lamination stack 46. In a number of variations, the second tooth 48 may be opposite of the first tooth 48. It is noted that a conduit may be formed through any area of the lamination stack 46 depending on design parameters of the system including, but not limited to, adjacent an opening 50 between the lamination stack teeth 48 on opposing ends, a variation of which is illustrated in phantom in FIG. 5, or at an end portion 120 of a lamination stack tooth 48 on opposing ends, a variation of which is also illustrated in phantom in FIG. 5. In a number of variations, a conduit 108, 110 may be inserted into a tooth bore 130 created through the tooth 48 of the lamination stack 46. In a number of variations, the retention fastener 102 may be attached to the conduit 108, 110 on a first side 132 of the tooth bore 130 to lock the retention device 184, 194 in place as shown in similar variations illustrated in FIG. 1.

It is also noted that a squeeze film dampener and roller bearing system is illustrated, however, any number of lubrication/cooling systems may be integrated with the above bearing lubrication system 72 without departing from the scope of the invention. In a number of variations, the product 10 including any of its components (including the lubrication system 74, shaft 36, retention components 184, 194, compressor wheel 34, turbine wheel 32, housing 54, 56, or may be another component) may be made of aluminum, cast iron, molded plastic, carbon fiber, other die cast metal, or other suitable material. In a number of variations, the components of the product 10 (including the lubrication system 74, shaft 36, retention components 184, 194, compressor wheel 34, turbine wheel 32, housing 54, 56, or may be another component) may be secured in the orientations illustrated by staking, casting it in position, machining, assembly, or other suitable means.

In a number of variations, a method is shown. In a number of variations, the method may include providing a turbomachinery device 10 comprising a rotational shaft 36, a first bearing 38, a second bearing 40 and an electric motor 42 comprising a stator 44 comprising a at least one retention component 184, 194 wherein the retention component 184, 194 is constructed and arranged to lock the stator 44 in an axial direction while locking rotation of the stator 44 about a rotational axis 16, and wherein the retention component 184, 194 further comprises at least one conduit 84, 94 constructed and arranged to pass fluid 74 through the electric motor 42 to a second bearing 40. In a number of variations, the method may further include feeding fluid 74 to one end of a housing 54, 56 so that fluid 74 is supplied to a first bearing 38 and through the at least one conduit 84, 94 so that fluid 74 is supplied to a second bearing 40.

In a number of variations, the retention component 184, 194 may be constructed and arranged to prevent or substantially lessen at least one of axial movement, rotational movement, or radial movement of the stator 44 in relation to the shaft 36 or housing 54, 56. In a number of variations, the retention component 184, 194 may be constructed and arranged to provide additional packing space within the product 10 due to its design and application. In a number of variations, the retention component 184, 194 may be constructed and arranged to allow for avoidance of certain assembly and disassembly methods such as, but not limited to, press fits or shrink fits of the stator 44 into the housing 54, 56.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a turbomachinery device comprising: an electric motor surrounding a portion of a shaft constructed and arranged to selectively drive the shaft in rotation about a rotational axis, wherein the electric motor further comprises a stator comprising a lamination stack; a housing surrounding the electric motor, wherein the housing includes a plurality of channels constructed and arranged to lubricate a first bearing; and wherein the lamination stack includes at least one retention component wherein the retention component is constructed and arranged to lock the stator in an axial direction while locking rotation of the stator about the rotational axis, and wherein the retention component further comprises at least one conduit constructed and arranged to pass fluid through the electric motor to a second bearing.

Variation 2 may include a product as set forth in Variation 1 wherein the lamination stack further comprises a plurality of teeth, and wherein the at least one conduit comprises a plurality of conduits which each extend through openings between the plurality of teeth.

Variation 3 may include a product as set forth in any of Variations 1-2 wherein the retention component comprises at least one retention fastener constructed and arranged to fix the stator to the housing.

Variation 4 may include a product as set forth in any of Variations 1-3 further comprising a turbocharger turbine wheel and wherein the shaft is operatively connected to the turbocharger turbine wheel, and wherein the turbocharger turbine wheel drives the shaft.

Variation 5 may include a product as set forth in any of Variations 1-4 further comprising a turbocharger compressor wheel and wherein the shaft is operatively connected to the turbocharger compressor wheel to drive the turbocharger compressor wheel.

Variation 6 may include a product as set forth in any of Variations 1-5 further comprising a first housing portion constructed and arranged to house the first bearing and having a first plurality of fluid channels; a second housing portion constructed and arranged to house the second bearing and having a second plurality of fluid channels; an fluid feed tube attached to the first housing portion, and wherein the first plurality of fluid channels and the second plurality of fluid channels are fluidly connected to the at least one conduit Variation 7 may include a product as set forth in Variation 6 wherein the first housing portion further includes a threaded bore defined by an inner threaded surface and wherein the fluid feed tube is at least partially threaded and is threaded into the threaded bore.

Variation 8 may include a product as set forth in Variation 7 wherein the fluid feed tube includes a pilot feature to prevent cross threading between the threaded bore and the fluid feed tube.

Variation 9 may include a product as set forth in any of Variations 1-8 wherein the at least one conduit is a first length and the stator is a second length, and wherein the first length of the at least one conduit is greater than the second length of the stator.

Variation 10 may include a product as set forth in any of Variations 3-9 wherein the retention component fastener comprises a nut attached to a first end of the at least one conduit to provide a preload for locking of the stator in a predetermined location.

Variation 11 may include a product as set forth in Variation 10 wherein a second end of the at least one conduit bottoms out in the second housing portion.

Variation 12 may include a product as set forth in Variation 10 wherein a first housing portion is slid over the nut to form a seal I.

Variation 13 may include a product as set forth in Variation 1 wherein the at least one conduit comprises at least one through-hole in the lamination stack defined by an inner cylindrical surface.

Variation 14 may include a product as set forth in Variation 13 wherein the at least one conduit extends through a tooth of the lamination stack.

Variation 15 may include a method comprising: providing a turbomachinery device comprising a rotational shaft, a first bearing, a second bearing and an electric motor comprising a stator comprising a at least one retention component wherein the retention component is constructed and arranged to lock the stator in an axial direction while locking rotation of the stator about a rotational axis, and wherein the retention component further comprises at least one conduit constructed and arranged to pass fluid through the electric motor to a second bearing; and feeding fluid to one end of a housing so that fluid is supplied to a first bearing and through the at least one conduit so that fluid is supplied to a second bearing.

Variation 16 may include a method as set forth in Variation 15 further comprising rotating the shaft about the rotational axis while locking the stator in place in the axial direction and about the rotational axis with the retention component.

Variation 17 may include a method as set forth in any of Variations 15-16 wherein the retention component comprises at least one retention fastener constructed and arranged to fix the stator to the housing.

Variation 18 may include a method as set forth in any of Variations 15-17 wherein the at least one conduit extends through a tooth of the stator.

Variation 19 may include a method as set forth in any of Variations 15-18 wherein the at least one conduit is a first length and the stator is a second length, and wherein the first length of the at least one conduit is greater than the second length of the stator.

Variation 20 may include a method as set forth in any of Variations 17-19 wherein a first end of the conduit is threaded to accept the at least one retention fastener.

The above description of select variations within the scope of the invention is merely illustrative in nature and, thus, variations or variants thereof are not to be regarded as a departure from the spirit and scope of the invention.

What is claimed is:

1. A product comprising:
   a turbomachinery device comprising:
   an electric motor surrounding a portion of a shaft constructed and arranged to selectively drive the shaft in rotation about a rotational axis, wherein the electric motor further comprises a stator comprising a lamination stack;
   a housing surrounding the electric motor, wherein the housing includes a plurality of channels constructed and arranged to lubricate a first bearing; and
   wherein the lamination stack includes at least one retention component wherein the retention component is constructed and arranged to lock the stator in an axial direction while locking rotation of the stator about the rotational axis, and wherein the retention component further comprises at least one conduit constructed and arranged to pass fluid through the electric motor to a second bearing.

2. The product of claim 1 wherein the lamination stack further comprises a plurality of teeth, and wherein the at least one conduit comprises a plurality of conduits which each extend through openings between the plurality of teeth.

3. The product of claim 1 wherein the retention component comprises at least one retention fastener constructed and arranged to fix the stator to the housing.

4. The product of claim 1 further comprising a turbocharger turbine wheel and wherein the shaft is operatively connected to the turbocharger turbine wheel, and wherein the turbocharger turbine wheel drives the shaft.

5. The product of claim 1 further comprising a turbocharger compressor wheel and wherein the shaft is operatively connected to the turbocharger compressor wheel to drive the turbocharger compressor wheel.

6. The product of claim 1 further comprising a first housing portion constructed and arranged to house the first bearing and having a first plurality of fluid channels; a second housing portion constructed and arranged to house the second bearing and having a second plurality of fluid channels; an fluid feed tube attached to the first housing portion, and wherein the first plurality of fluid channels and the second plurality of fluid channels are fluidly connected to the at least one conduit.

7. The product of claim 6 wherein the first housing portion further includes a threaded bore defined by an inner threaded surface and wherein the fluid feed tube is at least partially threaded and is threaded into the threaded bore.

8. The product of claim 7 wherein the fluid feed tube includes a pilot feature to prevent cross threading between the threaded bore and the fluid feed tube.

9. The product of claim 1 wherein the at least one conduit is a first length and the stator is a second length, and wherein the first length of the at least one conduit is greater than the second length of the stator.

10. The product of claim 3 wherein the retention component fastener comprises a nut attached to a first end of the at least one conduit to provide a preload for locking of the stator in a predetermined location.

11. The product of claim 10 wherein a second end of the at least one conduit bottoms out in the second housing portion.

12. The product of claim 10 wherein a first housing portion is slid over the nut to form a seal.

13. The product of claim 1 wherein the at least one conduit comprises at least one through-hole in the lamination stack defined by an inner cylindrical surface.

14. The product of claim 13 wherein the at least one conduit extends through a tooth of the lamination stack.

15. A method comprising: providing a turbomachinery device comprising a rotational shaft, a first bearing, a second bearing and an electric motor comprising a stator comprising at least one retention component wherein the retention component is constructed and arranged to lock the stator in an axial direction while locking rotation of the stator about a rotational axis, and wherein the retention component further comprises at least one conduit constructed and arranged to pass fluid through the electric motor to a second bearing; and feeding fluid to one end of a housing so that fluid is supplied to a first bearing and through the at least one conduit so that fluid is supplied to a second bearing.

16. The method of claim 15 further comprising rotating the shaft about the rotational axis while locking the stator in place in the axial direction and about the rotational axis with the retention component.

17. The method of claim 15 wherein the retention component comprises at least one retention fastener constructed and arranged to fix the stator to the housing.

18. The method of claim 17 wherein the at least one conduit extends through a tooth of the stator.

19. The method of claim 15 wherein the at least one conduit is a first length and the stator is a second length, and wherein the first length of the at least one conduit is greater than the second length of the stator.

20. The method of claim 17 wherein a first end of the conduit is threaded to accept the at least one retention fastener.

* * * * *